United States Patent

[11] 3,594,030

| [72] | Inventor | Richard K. Paetz<br>Sterling, Ill. |
|---|---|---|
| [21] | Appl. No. | 773,747 |
| [22] | Filed | Nov. 6, 1968 |
| [45] | Patented | July 20, 1971 |
| [73] | Assignee | National Manufacturing Co.<br>Sterling, Ill. |

[54] SAFETY GATE HOOK
3 Claims, 4 Drawing Figs.

[52] U.S. Cl.................................................... 292/108,
292/210, 292/285
[51] Int. Cl.................................................... E05c 19/12
[50] Field of Search........................................ 292/95,
108, 210, 285

[56] References Cited
UNITED STATES PATENTS

| 842,970 | 2/1907 | Parsons | 292/108 |
| 974,566 | 11/1910 | Giles | 292/108 X |
| 1,440,949 | 1/1923 | Aldrich et al. | 292/285 |
| 1,868,693 | 7/1932 | Capra | 292/108 |
| 2,470,706 | 5/1949 | Larson | 292/108 |

FOREIGN PATENTS

| 393,718 | 6/1933 | Great Britain | 292/108 |

*Primary Examiner*—Marvin A. Champion
*Assistant Examiner*—Robert L. Wolfe
*Attorney*—Fidler, Bradley, Patnaude & Lazo ABSTRACT: A safety gate hook includes a hook having a hook-shaped front end for hooking onto a wire staple of a staple plate and having a safety-latching dog pivotally mounted on the front end of the hook. The latching dog extends under the staple when the hook is hooked thereon to prevent a spurious upwardly directed force from unhooking the hook from the staple.

PATENTED JUL 20 1971 3,594,030

INVENTOR
RICHARD K. PAETZ

BY Fidler, Bradley & Palmatute

ATTYS.

SAFETY GATE HOOK

BACKGROUND OF THE INVENTION

This invention relates to safety gate hooks, and it more particularly relates to a gate hook which is used with a staple plate or the like to latch a gate or a door and which cannot be accidentally bumped or jarred out of engagement with the staple by a spurious upwardly directed force, such as a force produced by an animal bumping or butting the latch.

An ordinary gate hook latch, which includes a hook and a staple plate or screw eye, is not entirely suitable for some purposes, such as for the purpose of latching a gate which closes a cattle pen. The cattle or other animals confined in the pen are frequently able to force the latch open by accidentally bumping or jarring it. Therefore, in an attempt to overcome this problem, different types of safety gate hooks have been used. One type of safety gate hook includes a pivotally mounted clip and a spring which urges the clip against the end portion of the hook to retain the hook in engagement with a staple of a staple plate or screw eye. However, by exerting on the hook an upwardly directed force which is sufficient to overcome the spring tension exerted on the clip, an animal can force the hook out of engagement with the staple. Moreover, this type of hook cannot be easily and quickly used to hook onto the staple plate since the clip must first be pulled away from the end portion of the hook against the force of the spring.

Therefore, it is the principal object of the present invention to provide a new and improved safety gate hook.

Another object of the present invention is to provide a safety gate hook which cannot be accidentally unhooked by animals or humans and which is easily and quickly operated.

BRIEF DESCRIPTION OF THE INVENTION

Briefly, the above and further objects of the present invention may be realized by providing a hook which is adapted to be hooked onto a staple of a staple plate or the like and which has a pivotally mounted safety latching dog. The latching dog extends under the staple in a latching position when the hook is hooked on the staple to retain the staple between the hook and the latching dog. In order to automatically latch the hook to the staple, the latching dog has a cam surface which engages the staple to cause the latching dog to pivot away from the staple to permit the hook to engage the staple when the hook is held above the staple and then dropped thereon. Due to the location of the center of gravity of the latching dog, the latching dog returns to its latching position under the force of gravity once the hook engages the staple.

BRIEF DESCRIPTION OF THE DRAWINGS

The invention, both as to its organization and method of operation, together with further objects and advantages thereof will best be understood by reference to the following detailed description taken in connection with the accompanying sheet of drawings, wherein.

DETAILED DESCRIPTION OF THE PREFERRED EMBODIMENTS OF THE INVENTION

Figure 1:
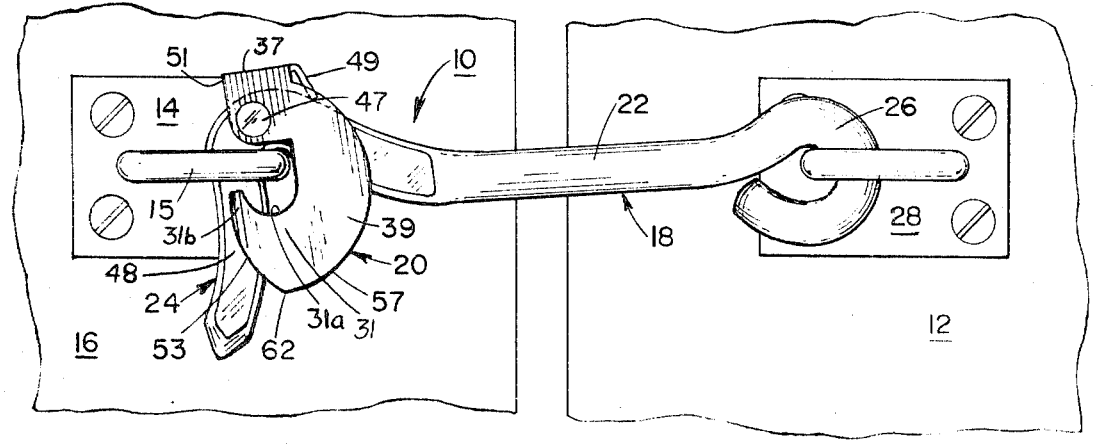
FIG. 1 is a side elevational view of the safety gate hook embodying the principles of the present invention and connected to a staple plate for latching a gate to a gate post in a closed position.
Figure 4:
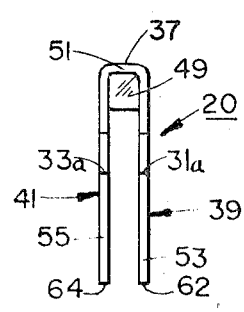
FIG. 4 is a front elevational view of the latching dog of the gate hook of FIG. 1.

Referring now to the drawings, and more particularly to FIG. 1 thereof, there is shown a safety gate hook 10 which embodies the present invention and which is swingably fastened to a gate 12 and hooked through a U-shaped staple 15 extending from a staple plate 14 which is adapted to be fastened to a gate post 16 by wood screws or the like. The gate hook 10 generally comprises a wire hook 18 having a safety latching dog 20 pivotally mounted on the hook to retain it in a latched position on the staple 15. The hook 18 has an intermediate shank portion 22 and a hook-shaped forward end portion 24. A rear end portion 26 of the hook member 18 is formed into an eye which is linked with and loosely engages the staple of a staple plate 28. The plate is adapted to be fastened to the gate 12 by means of wood screws or the like. The latching dog 20 is generally U-shaped, as best shown in FIG. 4, and fits over the forward end portion 24 of the hook 18. The side portions of the latching dog 20 are formed into latch portions 31 and 33. When the hook is in a locking position as shown in FIG. 1, the latch portions 31 and 33 extend under the staple 15 to prevent a spurious upwardly directed force from unhooking the hook 18 from the staple 15.

Figure 2:
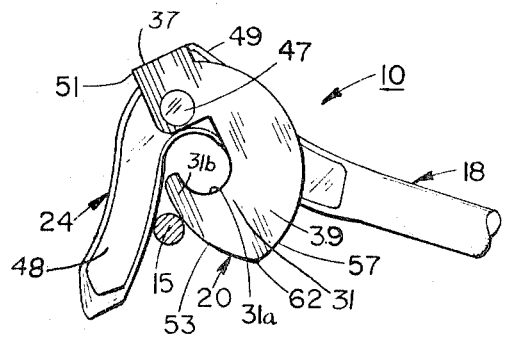
FIG. 2 is a fragmentary side elevational view of the gate hook of FIG. 1, illustrating the hook in the process of hooking onto the staple.
Figure 3:
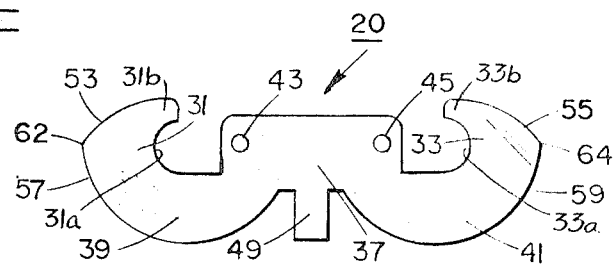
FIG. 3 is a view of a layout of the safety latching dog of the gate hook of FIG. 1.

Considering now the latching dog 20 in greater detail with reference to the drawings, the latching dog 20 may be a sheet metal stamping in the shape as shown in layout form in FIG. 3. When folded into its completed form as shown in FIG. 4, the latching dog 20 is generally U-shaped and includes a web 37 forming a protective cover which protects the pivotal connection between the hook 18 and the latching dog 20 from the elements. The latching dog 20 further includes a pair of depending side flange portions 39 and 41 which include the latching portions 31 and 33, respectively. As shown in FIG. 1, the latch portions 31 and 33 include a pair of notches 31a and 33a, respectively, which is disposed under the staple 15 in a latching position and are adapted to receive the staple 15. As shown in FIGS. 1 and 2, the notches 31a and 33a are substantially larger than the diameter of wire of which the staple 15 is formed so that the gate hook 10 can be used with various different sizes of wire for the staple or screw eye.

A pair of holes 43 and 45 are drilled or punched in the respective side portions 39 and 41 to receive a rivet 47, or the like, which extends through the holes 43 and 45 and an aligned hole (not shown) in the front end portion 24 of the hook 18. The head of the rivet 47 is shown in FIGS. 1 and 2 of the drawings, and the back end of the rivet 47 is staked. For the purpose of readily accommodating the latching dog 20 and to facilitate drilling the hole in the hook 18 for the rivet 47, the front end portion 24 includes a pair of flats 48 on the opposite sides thereof. In order to prevent the rivet 47 from rusting or corroding, the rivet is preferably composed of a nonferrous metal, such as brass, which permits the latching dog to pivot more quickly and smoothly with long lasting dependability.

As shown in FIG. 1, the rivet 47 about which the latching dog 20 pivots is disposed near the web portion 37 toward the front of the latching dog 20 and above the staple 15 when the hook 18 is hooked through the staple 15. As shown in FIG. 1, the rivet 15 is disposed forwardly of the leg of the staple 15 so that the latch portions 31 and 33 extend under the staple 15 in the latched position with a pair of upwardly extending finger portions 31b and 33b of the respective latch portions 31 and 33 being disposed forwardly of the surface of the staple 15 which is engaged by the hook 18. A tab 49 extends from the rear portion of the web 37 and is bent downwardly at an angle relative thereto to provide an abutment or stop member for the latching dog 20. As a result, after pivoting the latching dog 20 in a counterclockwise direction as seen in FIG. 1 to permit the hook 18 to be hooked onto the staple 15, the latching dog 20 pivots in a clockwise direction as seen in FIG. 1 under the force of gravity until the tab 49 contacts the front end portion 24 of the hook 18. A forward edge 51 of the web portion 37 serves as an abutment or stop member to limit the counterclockwise pivotal movement of the latching dog 20 to control the opening thereof.

The latching dog 20 of the safety gate hook 10 automatically moves into the latching position by merely holding the front end portion 24 of the hook 18 over the staple 18 and then dropping the hook 18. As shown in FIG. 2, in order to automatically open the latching dog 20 to permit the hook 18 to be hooked onto the staple 15, the latching dog 20 includes a pair of cam surfaces 53 and 55 on the leading edges of its respective side portions 39 and 41. For the purpose of hooking the hook 18 onto the staple 15, the forward end portion 24 is slipped over the staple 15 and is slid downwardly therealong. As the end portion 24 moves downwardly, the staple 15 engages the cam surfaces 53 and 55 to cam the latching dog in a counterclockwise direction as seen in FIG. 2 to permit the hook 18 to be hooked onto the staple 15. After the end portion 24 moves into hooking engagement with the staple 15, the latching dog 20 pivots in a clockwise direction under the force of gravity into its latching position as shown in FIG. 1.

A pair of rearwardly facing cam surfaces 57 and 59 on the respective side portions 39 and 41 tend to deflect a relatively large object, such as the nose of an animal, to prevent it from unhooking the hook 18. Should the object continue in an upward direction, the object moves the latching dog 20 and the hook 18 in an upward direction until the notches 31a and 33a of the latch portions 31 and 33 engage the underside of the staple 15 to positively lock the latching dog 20 on the staple 15. In order to prevent a relatively large object from moving the latching dog 20 out of its latching position, as shown in FIG. 1, the apexes 62 and 64 at the lowermost edges of the side portions 39 and 41, where the cam surfaces 53 and 55 meet their respective cam surfaces 57 and 59, are disposed at a relatively short distance away from adjacent portions of the hook-shaped front end portion 24, and the front end portion 24 extends below the apexes 62 and 64 by a relatively long distance so that the object is prevented from contacting cam surfaces 53 and 55. However, the tab 49 is bent at an angle to adjust the position of the latching dog 20 relative to the hook 18 such that the staple 15 is able to contact the cam surfaces 53 and 55 to cam the latching dog 20 into an open position upon hooking the hook 18 onto the staple 15. For the purpose of positioning the apexes 62 and 64 of the latching dog 20 as close as possible to the adjacent portion of the front end portion 24 and still permit the staple 15 to automatically open the latching dog 20, the tab 49 is bent at an angle relative to the web 37 to position the apexes 62 and 64 such that upon hooking the hook 18 onto the staple 15, the apexes first contact the staple at a critical distance away from the front end portion 24. The critical distance is slightly greater than the radius of the staple 15. In order to use the gate hook 10 with different sizes of wire for the staple 15, the tab 49 is bent to adjust the position of the latching dog 20 relative to the hook 18 in accordance with the above-mentioned critical distance for a given staple.

The hook 18 can be readily unhooked from the staple 15 by merely pivoting the latching dog 20 in a counterclockwise direction as seen in FIG. 1 and then slipping the hook 18 out of engagement with the staple 15.

While the present invention has been described in connection with particular embodiments thereof, it will be understood that many changes and modifications of this invention may be made by those skilled in the art without departing from the true spirit and scope thereof. Accordingly, the appended claims are intended to cover all such changes and modifications as fall within the true spirit and scope of the present invention.

I claim:

1. A safety gate hook adapted for use with a wire staple or the like, comprising
    a hook member having its rear end adapted to be swingable mounted and having a hook-shaped front end provided with a staple-engageable surface, and
    a generally U-shaped latching dog pivotally connected to said hook member and disposed over said hook-shaped front end portion thereof, said latching dog including a web forming a protective cover over the pivotal connection between the hook member and the latching dog, and a pair of depending side flange portions disposed on opposite sides of said hook member and having a latch portion, said latching dog being pivotable between a latching position where the latch portion is disposed under said staple-engageable surface to retain said staple between said latch portion and said hook member, and an open position where said latch portion is disposed away from said staple-engageable surface to permit said staple to enter the hook portion of said hook member, and wherein each one of said side flange portions includes a forwardly facing cam surface and a rearwardly facing cam surface, said cam surfaces meeting at an apex point, said apex point being rearwardly spaced from the adjacent portions of said hook-shaped front end by a distance slightly greater than the radius of the wire of which the staple is formed when said latching dog is in a latching position, whereby said forward facing cam surface is adapted to engage said staple to cause said latch portion to pivot away from its latching to its open position when said hood member is moved into engagement with said staple, and said rearward facing cam surface is adapted to cause said latching dog to pivot to a locking position in engagement with said staple in response to an upwardly directed spurious force thereon.

2. A safety gate hook according to claim 1, wherein said latching dog further includes an integral, bendable tab extending from said web for engaging said hook member to position said latching dog in a predetermined position relative to said hook member when said latching dog is in its latching position.

3. A safety gate hook according to claim 1, wherein said latching dog is biased under the force of gravity into its latching position.